Figure 7:
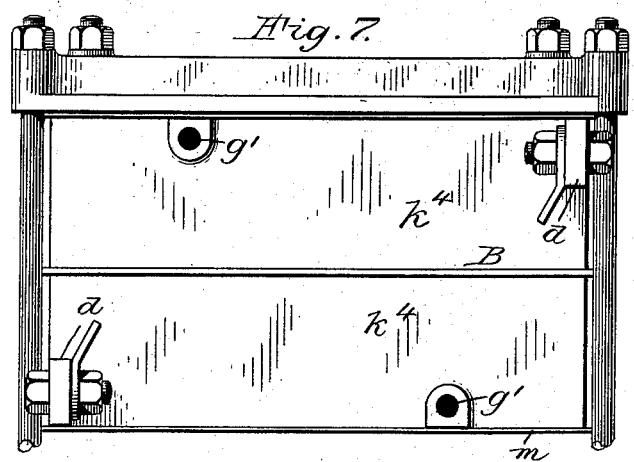

(No Model.) 3 Sheets—Sheet 1.
R. EICKEMEYER.
SECONDARY BATTERY.
No. 413,339. Patented Oct. 22, 1889.
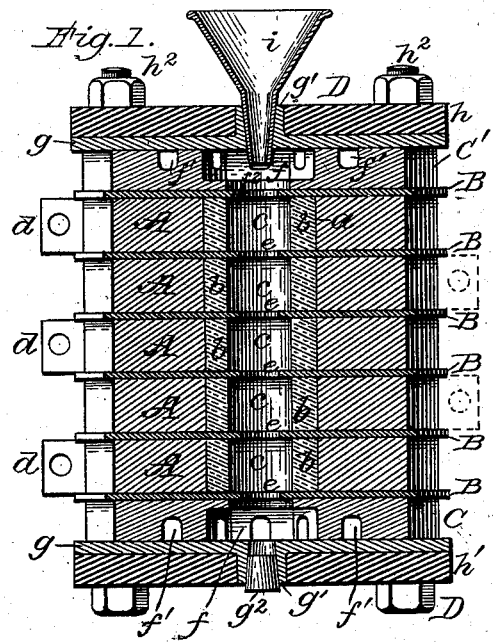
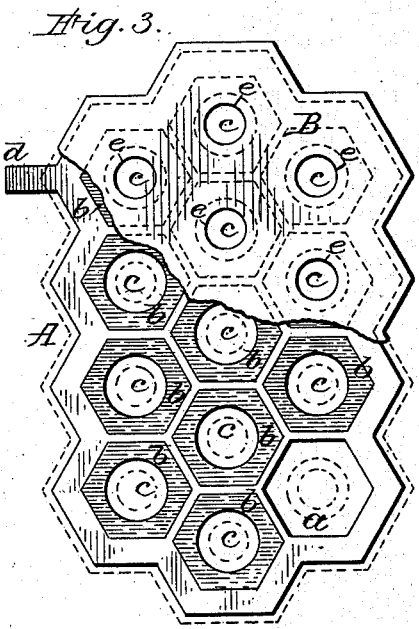
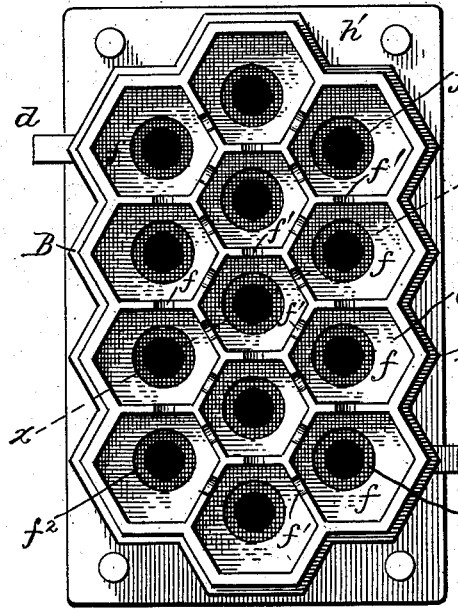
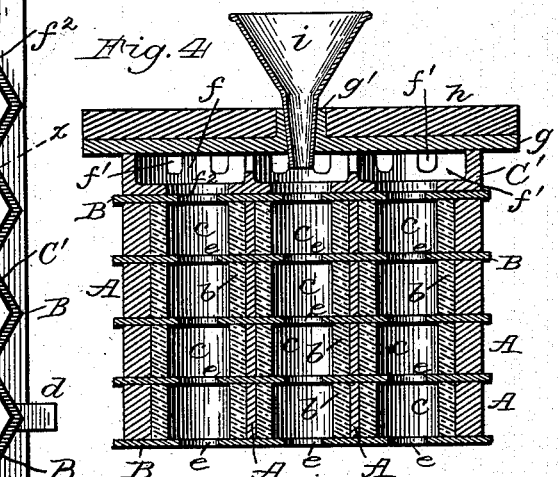
Attest:
Philip F. Larner.
Howell Bartle
Inventor:
Rudolf Eickemeyer.
By M. C. Ward
Attorney.
N. PETERS, Photo-Lithographer, Washington, D. C.

(No Model.) 3 Sheets—Sheet 2.
R. EICKEMEYER.
SECONDARY BATTERY.
No. 413,339. Patented Oct. 22, 1889.
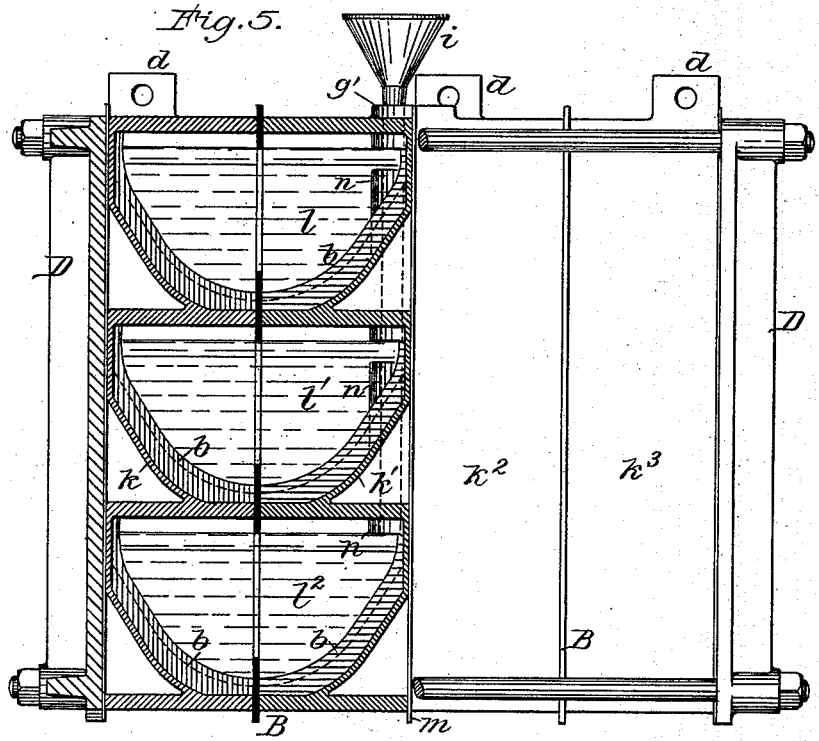
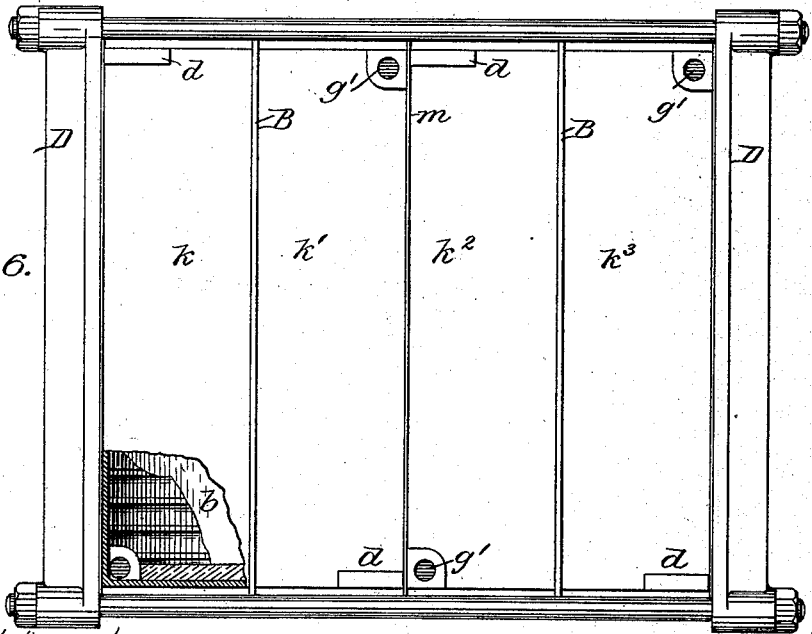
Attest:
Philip F. Larner.
Howell Bartle.
Inventor:
Rudolf Eickemeyer.
By his Attorney.

(No Model.) 3 Sheets—Sheet 3.

R. EICKEMEYER.
SECONDARY BATTERY.

No. 413,339. Patented Oct. 22, 1889.

Attest:
Philip F. Larner.
Howell Bartle

Inventor:
Rudolf Eickemeyer.
By M. C. Ward
Attorney.

N. PETERS, Photo-Lithographer, Washington, D. C.

UNITED STATES PATENT OFFICE.

RUDOLF EICKEMEYER, OF YONKERS, NEW YORK.

SECONDARY BATTERY.

SPECIFICATION forming part of Letters Patent No. 413,339, dated October 22, 1889.

Application filed March 7, 1889. Serial No. 302,253. (No model.)

*To all whom it may concern:*

Be it known that I, RUDOLF EICKEMEYER, of Yonkers, in the county of Westchester and State of New York, have invented certain new and useful Improvements in Secondary or Storage Batteries; and I do hereby declare that the following specification, taken in connection with the drawings furnished and forming a part of the same, is a clear, true, and complete description of the several features of my invention.

Briefly stated, the objects of my invention are to secure that high efficiency which is incident to an abundance of porous active material arranged to afford extensive areas of exposure to the electrolytic fluid in connection with comparatively light weight, compactness, durability, cleanliness in use, simplicity in construction, economy in manufacture, freedom from that liability of short-circuiting from plate to plate heretofore incident to the communicating contact of porous material liable to be displaced from its normal positions, avoidance of exposure of the metallic lead in the plates, grids, or frames to the direct contact with the electrolyte, and a consequent freedom from partial shunting of the charging current around the active material, convenience in supplying the electrolyte and discharging it, and a capacity for freely discharging the gases developed within the battery, while maintaining sufficient hydrostatic pressure within the battery to prevent undue disturbance of the electrolyte by the bursting of the gas-bubbles evolved from the fluid during the charging operation. All of these ends will accrue as results of my improvements in batteries embodying my entire invention in what I deem its best form, and more or less of said ends will accrue from the use of one or more of such of the several features of my invention as are capable of being embodied in batteries which in form and construction differ more or less from those in which my entire invention can be best embodied.

After describing my improvements in connection with the several batteries illustrated in the drawings the features deemed novel will be duly specified in the several clauses of claim hereunto annexed.

Figure 12:
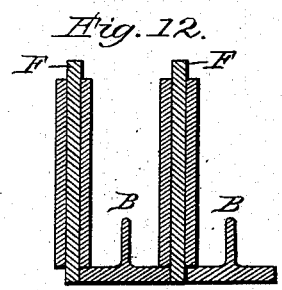
Figure 8:
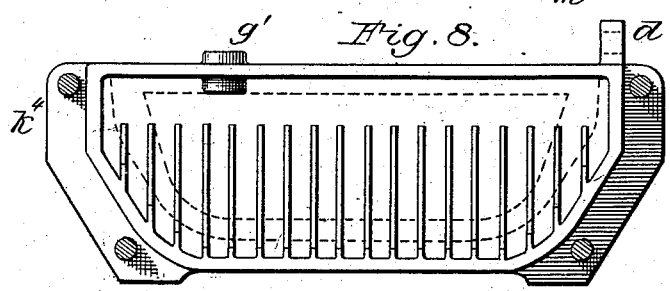
Figure 9:
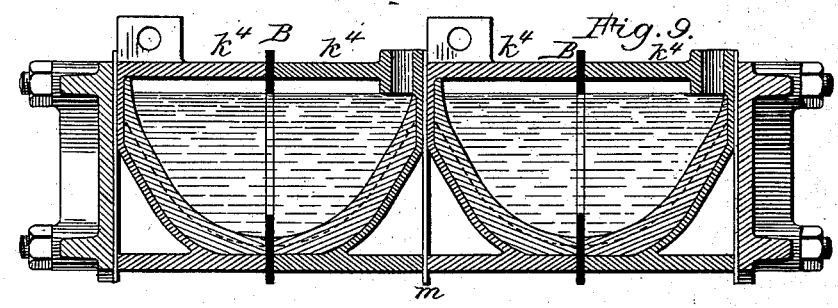
Figure 10:
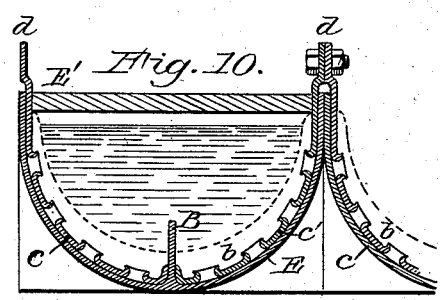
Figure 11:
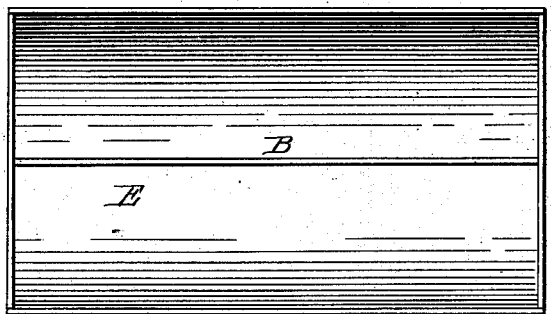

Referring to the drawings, Figure 1 illustrates one of my batteries in what I consider its best form in central vertical cross-section. Fig. 2 is a plan view of the same with its cap or top portion removed. Fig. 3 is a plan view of a part of one of the complete plates or elements, and also of a portion of one of several insulating-plates. Fig. 4 is a vertical cross-section of the battery on the diagonal line $x$, Fig. 3. Fig. 5, Sheet 2, partially in side view and partially in central vertical section, illustrates one of my batteries embodying certain portions of my invention. Fig. 6 is a top view of said battery Fig. 5 with a portion of its cover broken away, and also with a portion of the porous active material removed from one of the elements. Fig. 7 in top view illustrates a battery of another form resembling that of Fig. 5. Fig. 8 is a side view of one-half of the battery Fig. 7 without its active porous material. Fig. 9 in central section illustrates two of the batteries Fig. 7 with their porous material and the electrolyte. Fig. 10 in cross-section illustrates a battery similar in form to that of Fig. 7, but involving a tank of glass or other suitable non-corrosive material. Fig. 11 is a top view of said tank. Fig. 12 illustrates a portion of my invention as applied to plates resembling ordinary forms as employed in vessels for containing the electrolyte.

I will first describe the battery shown in Figs. 1 to 4, inclusive. Any desired number of elements may be employed in each battery; but in this instance five are shown, each consisting of a flat cast-lead plate or foundation A, having any desired number of holes or openings, as at $a$, and these may be round, but are preferably polygonal, as shown. Each opening $a$ is lined or coated with suitable porous active material $b$, applied, as usual, in plastic form and well packed around plugs, which, when removed, will leave the central openings $c$. The outlines or edges of the plate may be straight; but for avoiding unnecessary cost and weight said outline should conform to the polygonal character of the openings $a$, and each plate has projecting from one edge a terminal $d$. These plates, grids, or frames are counterparts cast from the same pattern, and when reversed in position and piled one on another, as shown, with the terminals located alternately on opposite sides, the several holes $c$ register with appropriate holes in all the plates throughout the pile. Between each two of these lead plates or elements an insulating-plate B is interposed, and this may be composed of mica or vulcanized fiber or hard rubber, or any of the well-known non-corrosive insulating materials; but each is essentially provided with a series of holes $e$, which register with the holes $c$. It will be within certain portions of my invention if said holes $e$ are of the same size as the lined holes $c$; but one feature of my invention consists in having said insulating-plates so project into the central space that active material liable to be displaced from the lining of the holes $c$ cannot overlap and short-circuit with an adjacent plate, and this is prevented in this battery by having the holes $e$ considerably smaller and of less area than said holes $c$, as clearly indicated in the drawings. At the bottom of the pile there is a base-plate C and at the top a top plate C', these being counterparts and composed of any suitable material, such as lead, hard rubber, or gutta-percha. These plates are provided with polygonal chambers $f$, communicating with each other by way of channels or posts $f'$ and with the cells or spaces $c$ by circular holes $f^2$. Below and above the base-plate C and top plate C', respectively, there are thin plates $g$, which are counterparts in form, are composed either of lead or insulating material, and have each a central opening $g'$, which is flanged or sleeved, as clearly indicated. These plates $g$ serve as one side of the several chambers $f$ and channels $f'$ in the base-plate and top plate. The lead plates A, insulating-plates B, base-plate C, top plate C', and plates $g$ thus piled are firmly confined by a suitable clamp capable of maintaining them in position and securing water-tight joints between the several plates, and to render leakage practically impossible paraffine or other similar plastic insulating matter may be employed.

The clamp D here shown consists of two counterpart binding-plates $h$ and $h'$, which may be composed of cast-iron or wood, and with these binding-plates suitable bolts $h^2$ are employed. With the battery thus constructed each vertical line of holes $c$ constitutes a cell or chamber for containing the liquid electrolyte, and this is supplied by means of a stand-pipe or funnel $i$, which tightly fits the feed-aperture $g'$ at the top, the lower central sleeved hole $g'$ being meantime stopped by a rubber plug $g^2$. As the liquid falls to the bottom of the battery it is distributed by way of the lower channels and openings $f'$ $f^2$ in the base-plate C to the several cells $c$, in which it rises with uniformity until all are properly filled, even to partially filling the recesses in the upper plate C'. It will be seen that an extensive area of the porous material is exposed to the electrolyte, and that the metallic lead of each grid, frame, or plate is absolutely protected against the liquid, except through the active material, and that the gases developed can be freely discharged from all of the cells by way of the upper chambers $f$ and channels $f'$. These upper chambers and channels and the holes $f^2$, with which they communicate, are only partially filled with the electrolyte, because the lower end of the stand-pipe funnel $i$ is at such a level that when the electrolyte is supplied up to that point air will be confined in said channels and holes and resist the further admission of the electrolyte. The stand-pipe funnel may be of any desired height, and when it contains electrolyte, after no more can enter the battery, hydrostatic pressure is developed, and the pressure of the air upon the upper surface of the electrolyte will be equal to the pressure induced by the column of electrolyte in the stand-pipe, and hence gas-bubbles evolved during the charging operation cannot explode on leaving the liquid, because the gas will be discharged into spaces wherein the pressure is substantially the same as that within the liquid from which the gases escape, thus preventing any undue disturbance or throwing up of the electrolyte.

It will be obvious, considering the efficiency due to the extensive area of the active material exposed to the electrolyte and the comparatively light internal resistance, that this battery is of exceeding light weight and small in bulk, and that it can be cheaply constructed without impairing its efficiency and durability, and also that it will be practically impossible for displaced active material from any one element to lodge against and make contact with an adjacent element, thus obviating all liability of short-circuiting, and also that the circuit from plate to plate through the electrolyte is practically free and unobstructed. It will also be seen that the stand-pipe funnel $i$, in addition to its ordinary function, prevents untidy overflow of the electrolyte during rapid development of gases, and also enables convenient observation as to a full supply of the electrolyte within the battery.

I believe I am the first to devise specially-formed counterpart castings of lead each provided with holes or recesses which are lined or coated with active material, and which register with the coated holes or recesses in other castings, so that when any two or more of them are clamped together they constitute or afford cells for the reception of electrolytic fluid, and also the first to employ insulating-plates between such castings, which not only properly separate the elements, but also project into the electrolytic space and render it practically impossible for displaced active material from the surfaces of the lead castings to short-circuit with adjacent elements, and yet leave the circuit through the electrolyte practically unobstructed; and I believe I am also the first to so apply the active material to the lead grids, frames, or plates and so protect the metal in said plates from contact with the electrolyte that the entire charging-current must pass through all of the active material, and these features of my invention are not restricted to batteries embodying the flat-plate castings or frames already described—as, for instance, in the battery shown in Figs. 5 and 6, wherein there are six cells, three of which are in each of two sections, and in each section the cells are arranged in a vertical pile, as clearly indicated in Fig. 6. Four lead castings or foundations $k$ $k'$ $k^2$ $k^3$ are exact counterparts, and each is recessed in proper form to provide in each casting for three halves of three cells or chambers $l$ $l'$ $l^2$, and any two of these castings placed opposite each other in a reversed position complete the cells, with the insulating-plate B interposed between them, this plate projecting at all points into the cell and having a central opening or hole conforming generally to the longitudinal sectional lines of the interior of the cell. Between the coincident backs of the castings or frames an insulating-plate $m$ is employed, and others between the castings and the clamp D, which is as before described. The lead castings at the interior of their sides, ends, and bottoms of the cells are coated with active material $b$, suitable ribs or other form of projections being provided in the castings to enable a desirable union of the plastic matter therewith. Each casting has its terminal $d$, so that one pair of terminals serves for the three cells. Each casting has also at one corner thereof, at its top, an opening $g'$, and a stand-pipe funnel $i$ and tubes $n$ afford communication from the upper cells to the lower, the tops of these tubes being slightly below the liquid level desired, and their bottoms being at or about even with said line, so that on pouring liquid through the funnel some of it may pass downward and some of it into the upper cell, and when the liquid in either of the cells has reached the level of the lower end of a tube $n$ the confined air or gas in the space above said level precludes the further entrance of liquid. These tubes also afford a desirable vent for such gases as are usually developed, and the funnel, being tightly seated, enables the incident rise and fall of the liquid contents without liability of untidy overflow.

In this battery there are two charging-apertures for each upper cell or receptacle, and both of these may be provided with a stand-pipe, or one of them may be tightly plugged, and in each of the cells the pressure in the gas or air space will prevent the bursting of the gas-bubbles on leaving the liquid. As in the first battery described, the electrolyte is well confined in closed cells, and the terminals are in no manner exposed to contact with either the liquid or gases, and but little, if any, portion of the lead casting is exposed to the liquid when the battery is in use under normal conditions. It will be seen that each casting for this form of battery may be provided with any desired number of cell-recesses, and that the construction shown will enable a battery to be made with special reference to fully occupying some particular space, as on boats or ships or in other places where space should be specially economized. With inclined and curved surfaces inside of the cells, as shown, the active material is but little liable to displacement; but when that does occur the inwardly-projecting insulating-plates obviate all liability of short-circuiting.

In some cases it is desirable that each cell or electrolyte-receptacle should be electrically independent of others, instead of providing several with one pair of terminals, and also to arrange for a horizontal distribution of cells as distinguished from a vertical arrangement thereof—as, for instance, as shown in Figs. 7, 8, and 9, wherein each counterpart frame or casting $k^4$ serves as one-half of a cell, and is provided with a terminal $d$ and feed-opening $g'$, and any number of these in proper order, placed side by side with the interposed insulating-plates B and with the insulating-plates $m$, can be united by the clamp D, which is as before described. That portion of my invention which relates to obviating the liability of short-circuiting incident to displaced active material is not restricted to batteries in which an inclosed electrolytic receptacle is formed by the counterpart castings—as, for instance, in the battery shown in Figs. 10 and 11. In this instance a tank or cup E is employed, and this may be wholly of glass or glass-lined metal, or of any other suitable non-conducting, non-corrosive, and durable material. As an essential feature, however, there must be the insulating-plate B, centrally rising from the bottom of the cup, and this plate may be composed of any suitable material, however confined in place, or it may be integral with the cup, as shown. A pair of thin sheets of lead $c$ $c'$ are properly roughened or punched and bent to conform to one side of the interior of the cup, each extending from the insulating-plate B upward and having a projecting portion at its top to serve as a terminal $d$. The active material $b$ is applied as before described, and a suitable cover E' is tightly fitted to the top of the cup. A series of such cups may be conveniently coupled at their terminals, as shown, and several of them may, if desired, be placed within a suitable box for maintaining them in proper position and convenient for handling.

In such of my batteries as have castings or frames which serve as cells or receptacles for the electrolyte, it will be seen that each plate or casting is restricted to one polarity as distinguished from such as have both sides of the plate or casting coated with active material and subjected to the electrolyte, as is common in secondary batteries having flat plates, and also as in some prior batteries, wherein the supporting-lead is in cup-shaped forms, nested one within another, and so on, the intervening spaces being filled with the liquid, the inner and outer surfaces of the cups being of opposite polarity. In my batteries the interior circuit is wholly confined from one plate or casting to another through the electrolyte, and thence by way of exterior conductors to other plates; but in all other instances known to me of batteries affording tight receptacles for the electrolyte between clamped lead plates or castings the circuit is not only from plate to plate through the electrolyte, but also through each plate from side to side; and in this latter form of batteries I can to good advantage employ that portion of my invention which relates to preventing short-circuiting by displaced oxides—as, for instance, as shown in Fig. 12, wherein the plates F are substantially as heretofore; but the insulating-plates B, instead of being mere parting slips between the plates, are at the bottom in the form of the letter T inverted, so that a portion thereof projects into the space occupied by the electrolyte, thus leaving at the base of each plate ample room for more or less displaced active material without liability of short-circuiting with the next plate. The presence of this projected portion of the insulating-plate does not materially obstruct the circuit through the electrolyte nor impair the efficiency of those portions of the active material which are opposite the insulating-plate.

Having thus described my invention, I claim as new and desire to secure by Letters Patent—

1. In a secondary battery, the combination, substantially as hereinbefore described, of a suitable clamp and two or more counterpart lead castings or foundations insulated from each other, and each provided with holes or recesses lined or coated with active material which register with similarly lined or coated holes or recesses in the next adjacent casting or foundation and afford spaces or cells for the reception of the electrolyte.

2. In a secondary battery, the combination, substantially as hereinbefore described, of a suitable clamp, one or more pairs of elements, each composed in part of a foundation or support of metallic lead and in part of suitable porous active material applied thereto as a lining or coating, the coated surfaces serving as walls to a space for the reception of electrolyte, and plates which not only insulate said foundations or supports from each other, but also project into the space occupied by the electrolyte and obviate liability of short-circuiting, due to displaced active material, without obstructing the circuit through the electrolyte.

3. In a secondary battery, the combination, substantially as hereinbefore described, of two or more lead plates substantially counterparts in form and dimensions, each provided with holes or openings extending through from side to side and lined or coated with suitable porous active material, said plates piled one above another, the registering holes constituting in each instance a cell lined with said porous material for receiving electrolyte, interposed insulating-plates provided with holes registering with those in the lead plates, and a clamp for firmly binding the several plates together.

4. In a secondary battery, the combination, substantially as hereinbefore described, of two or more metallic lead plates or foundations, each having one or more holes which extend through from side to side and are lined or coated with suitable porous active material, said holes in each plate registering with corresponding holes in the other plates, interposed insulating-plates provided with holes which register with but are of less area than said lined holes, and a suitable clamp for tightly binding all of said plates in a pile and enabling the registering holes to serve as suitable receptacles for liquid electrolyte, and also enabling said insulating-plates to thoroughly protect the metallic lead in the foundation-plates from direct contact with the electrolyte, and still further to support the active material and prevent displaced portions thereof from making short-circuit contact with the adjacent lined or coated surfaces of other plates.

5. In a secondary battery, the combination, substantially as hereinbefore described, of two or more substantially counterpart piled lead plates, each provided with holes extending through from side to side, which register with corresponding holes in adjacent plates in the pile and are lined or coated with suitable porous active material, said registering holes constituting cells or spaces for the reception of electrolyte, insulating-plates between said lead plates and provided with similarly registering holes, a clamp, and between the clamp and the lead plates at the top and bottom of the pile other plates provided with holes and channels which communicate with all of the electrolyte-spaces, whereby all of said cells or spaces may be readily charged with electrolyte and free vent afforded for the gases developed within the battery.

6. The combination, with a secondary battery having a tightly-inclosed cell or space for the electrolytic liquid and a feed-aperture, of an open stand-pipe which tightly fits said aperture and projects below the upper interior surface or wall of said space or cell, substantially as described, whereby the battery may be conveniently charged with electrolyte, the supply of the latter readily observed, a vent afforded for gases, hydrostatic pressure maintained in an interior air-space which receives the gases on leaving the electrolyte, and affording in said stand-pipe ample space in which the electrolyte may rise under rapidly-developed gaseous pressure, without liability of overflow.

RUDOLF EICKEMEYER.

Witnesses:
RUDOLF EICKEMEYER, Jr.,
E. P. MOFFAT.